(12) United States Patent
Nuss

(10) Patent No.: US 9,115,521 B2
(45) Date of Patent: Aug. 25, 2015

(54) MOTOR VEHICLE FOLD-DOWN ARMREST

(75) Inventor: Ralph Nuss, Poppenricht (DE)

(73) Assignee: GRAMMER AG, Amberg (DE)

( * ) Notice: Subject to any disclaimer, the term of this patent is extended or adjusted under 35 U.S.C. 154(b) by 664 days.

(21) Appl. No.: 13/424,415

(22) Filed: Mar. 20, 2012

(65) Prior Publication Data

US 2012/0242131 A1    Sep. 27, 2012

(30) Foreign Application Priority Data

Mar. 21, 2011    (DE) .......................... 10 2011 014 620

(51) Int. Cl.
*B60N 2/46* (2006.01)
*E05D 11/10* (2006.01)
*B60N 3/10* (2006.01)

(52) U.S. Cl.
CPC ............ *E05D 11/1028* (2013.01); *B60N 2/466* (2013.01); *B60N 2/4633* (2013.01); *B60N 3/101* (2013.01); *E05Y 2900/538* (2013.01)

(58) Field of Classification Search
CPC .......................... B60N 2/4606; B60N 2/4633
USPC ............. 297/115, 411.32, 411.38; 296/24.34, 296/37.8
See application file for complete search history.

(56) References Cited

U.S. PATENT DOCUMENTS

| | | | |
|---|---|---|---|
| 5,116,099 A | | 5/1992 | Kwasnik et al. |
| 6,003,947 A | * | 12/1999 | Rye .......................... 297/411.38 |
| 6,565,156 B1 | * | 5/2003 | Yamashita et al. ........ 297/354.12 |
| 6,755,474 B2 | * | 6/2004 | Magnuson ............... 297/411.38 |
| 7,100,242 B2 | * | 9/2006 | Maierholzner ................. 16/319 |
| 7,108,318 B2 | * | 9/2006 | Himmelhuber et al. ...... 297/115 |
| 7,108,328 B2 | * | 9/2006 | Himmelhuber et al. . 297/411.38 |
| 8,047,592 B2 | * | 11/2011 | Cho ........................... 296/24.34 |
| 8,550,505 B2 | * | 10/2013 | Nuss et al. ........................ 292/1 |
| 8,662,594 B2 | * | 3/2014 | Faccin ..................... 297/411.38 |
| 2005/0161983 A1 | | 7/2005 | Himmelhuber et al. |
| 2009/0284034 A1 | | 11/2009 | Nuss et al. |

FOREIGN PATENT DOCUMENTS

DE    102006048107 A    4/2008
JP        10278656 A    10/1998

* cited by examiner

*Primary Examiner* — Laurie Cranmer
(74) *Attorney, Agent, or Firm* — Andrew Wilford

(57) ABSTRACT

A motor-vehicle accessory having a pivotal element that can pivot about an axis on a generally fixed support element is provided with a mechanism having an extension on one of the elements offset from the axis and projecting angularly of the axis and a brake on the other of the elements. This brake has a pair of brake shoes flanking the extension and shiftable between a clamping position gripping the element and preventing movement of the element relative to the brake in at least one angular direction and a release position permitting movement of the element relative to the brake both in and against the one direction.

8 Claims, 15 Drawing Sheets

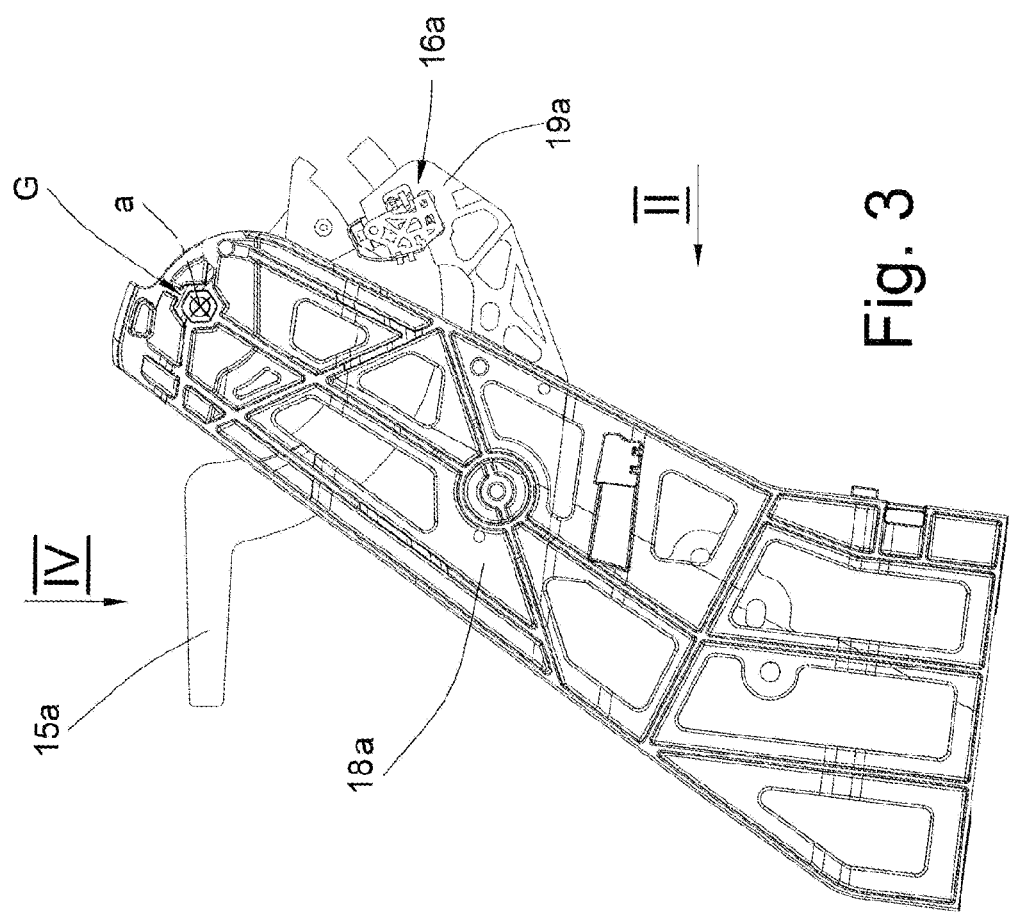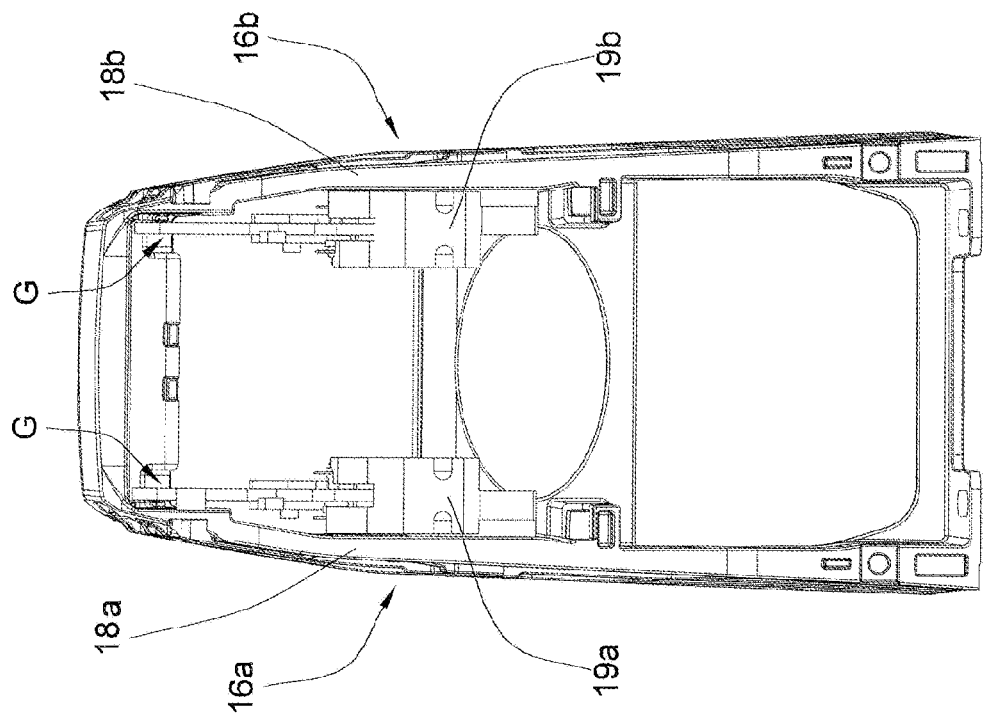

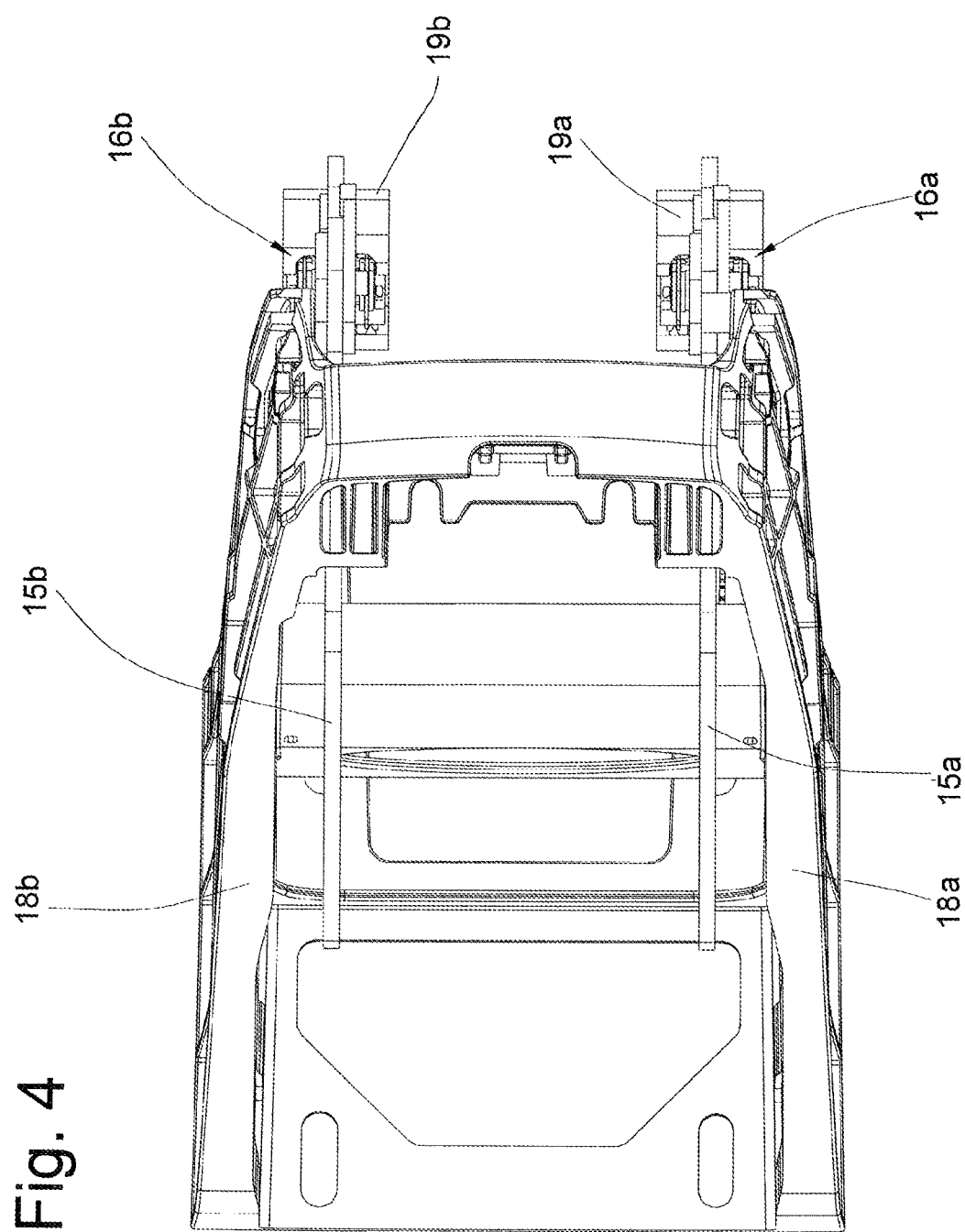

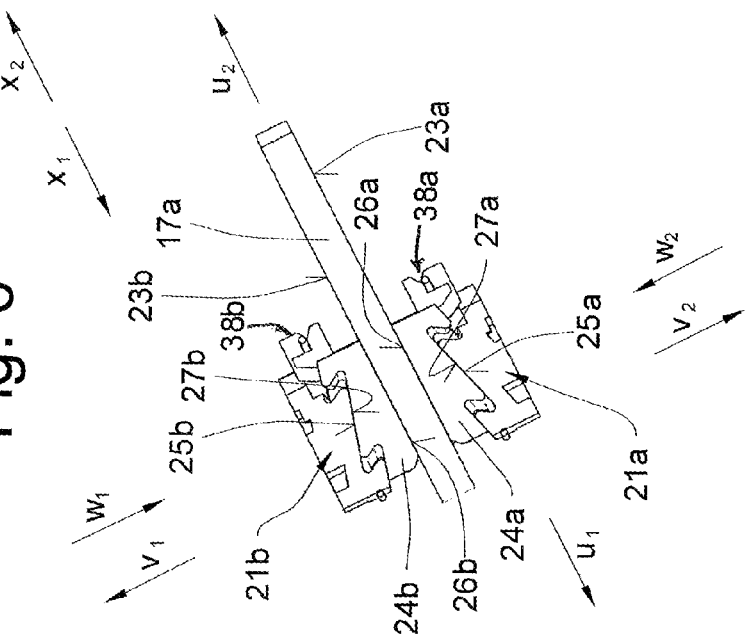
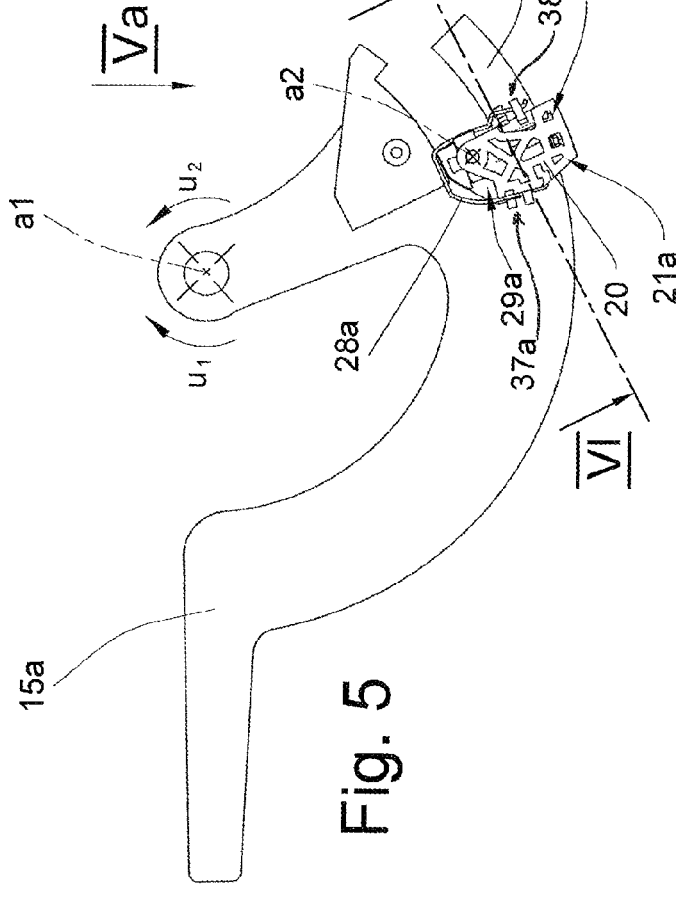
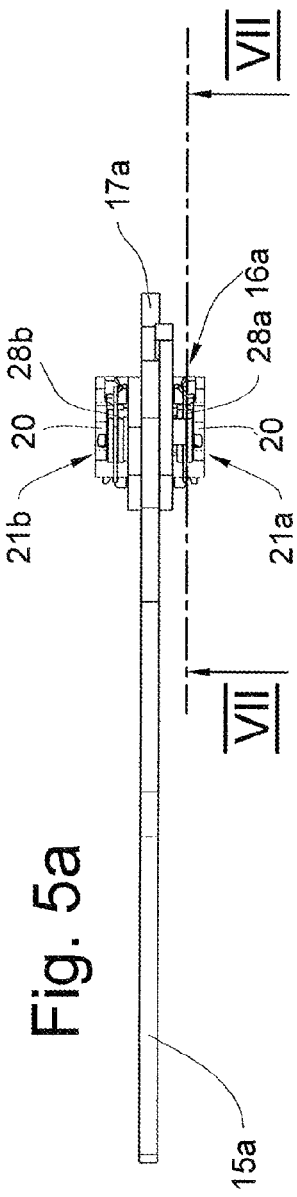

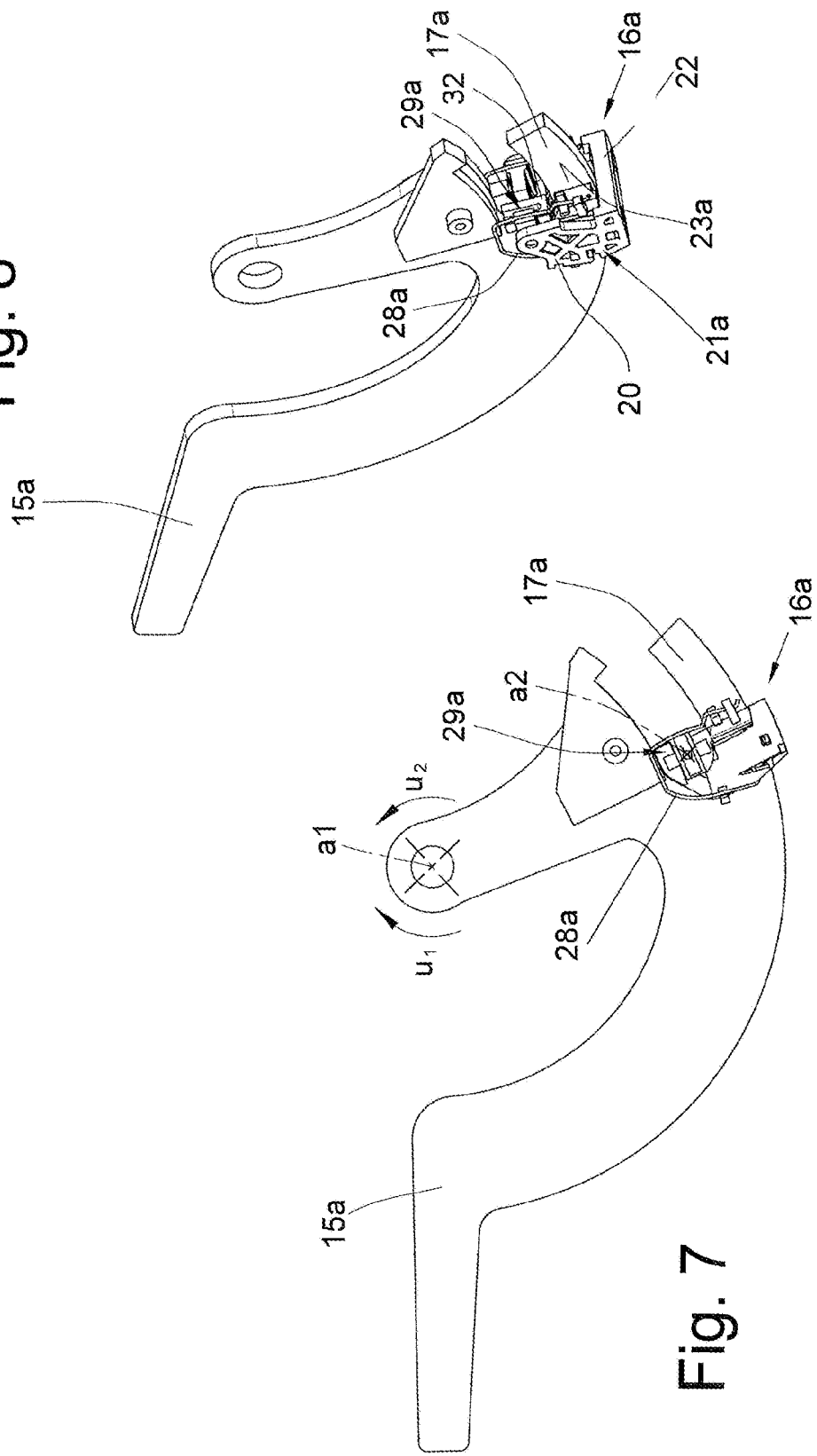

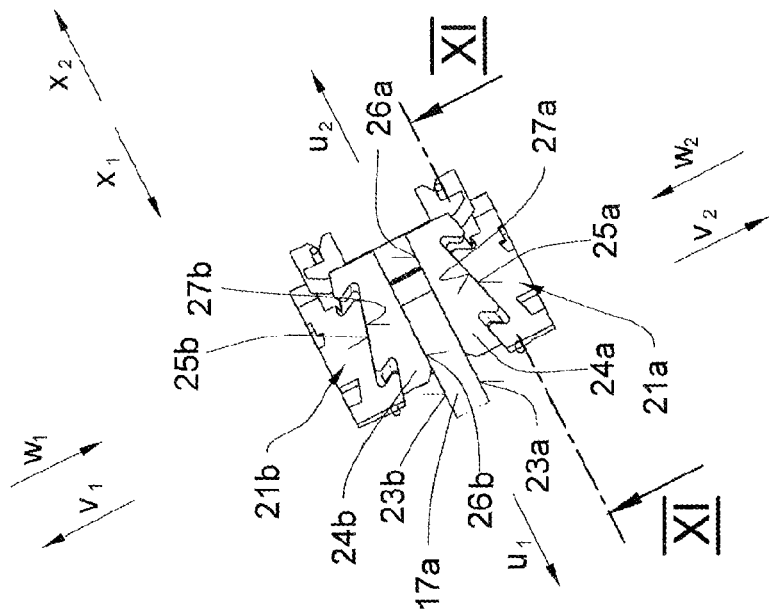
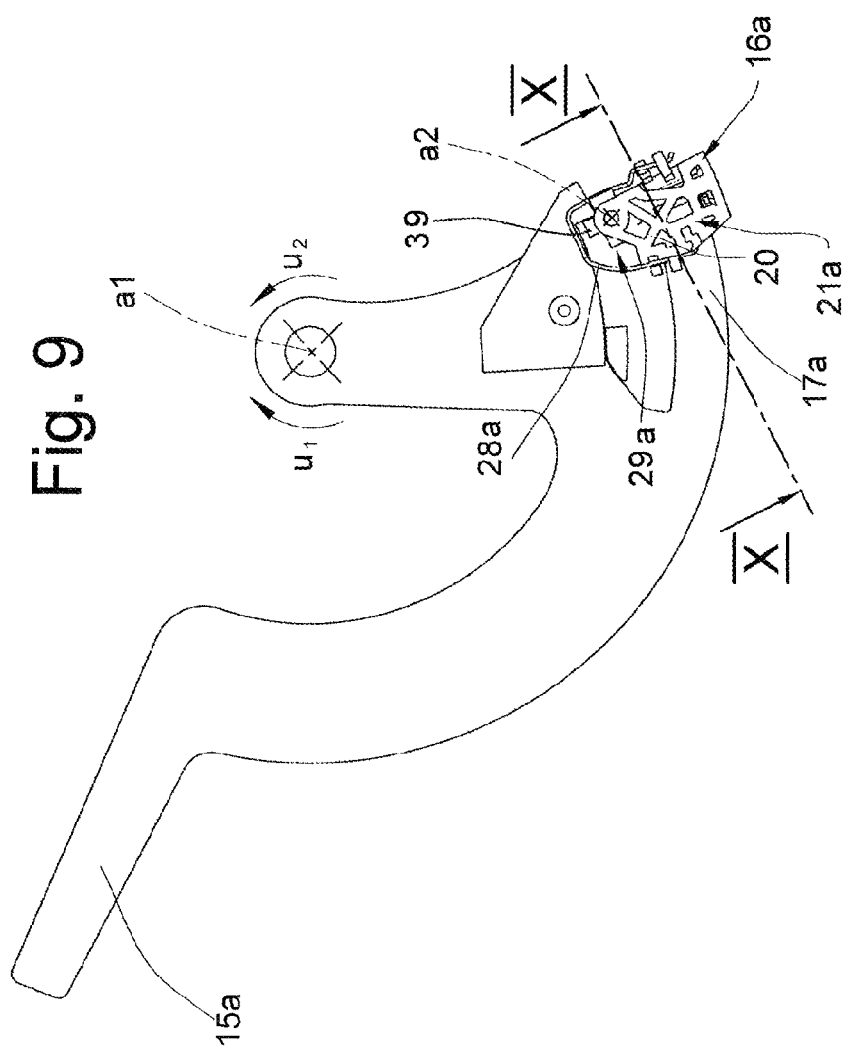

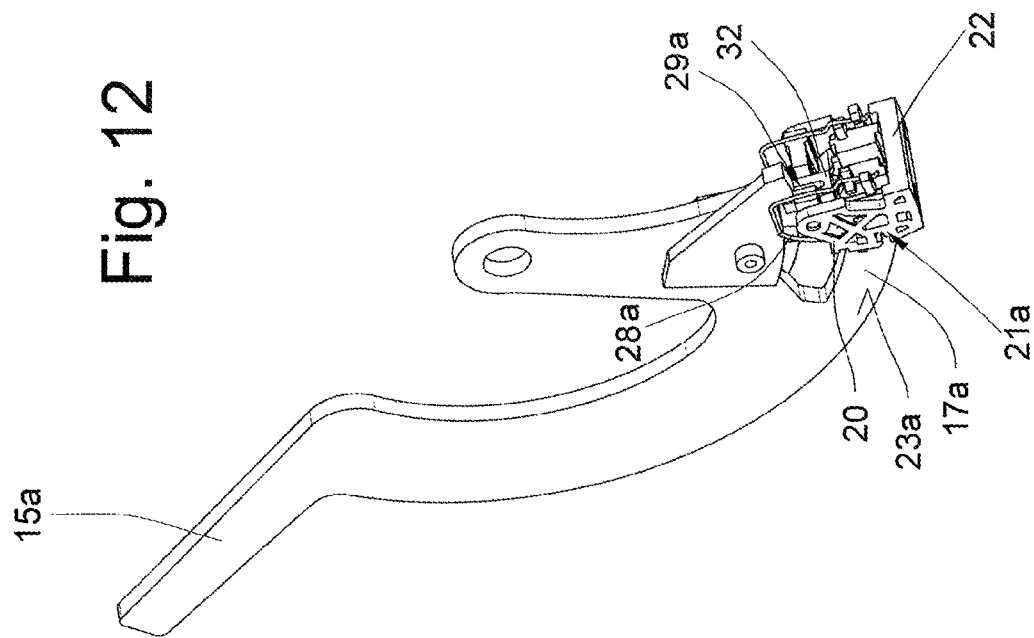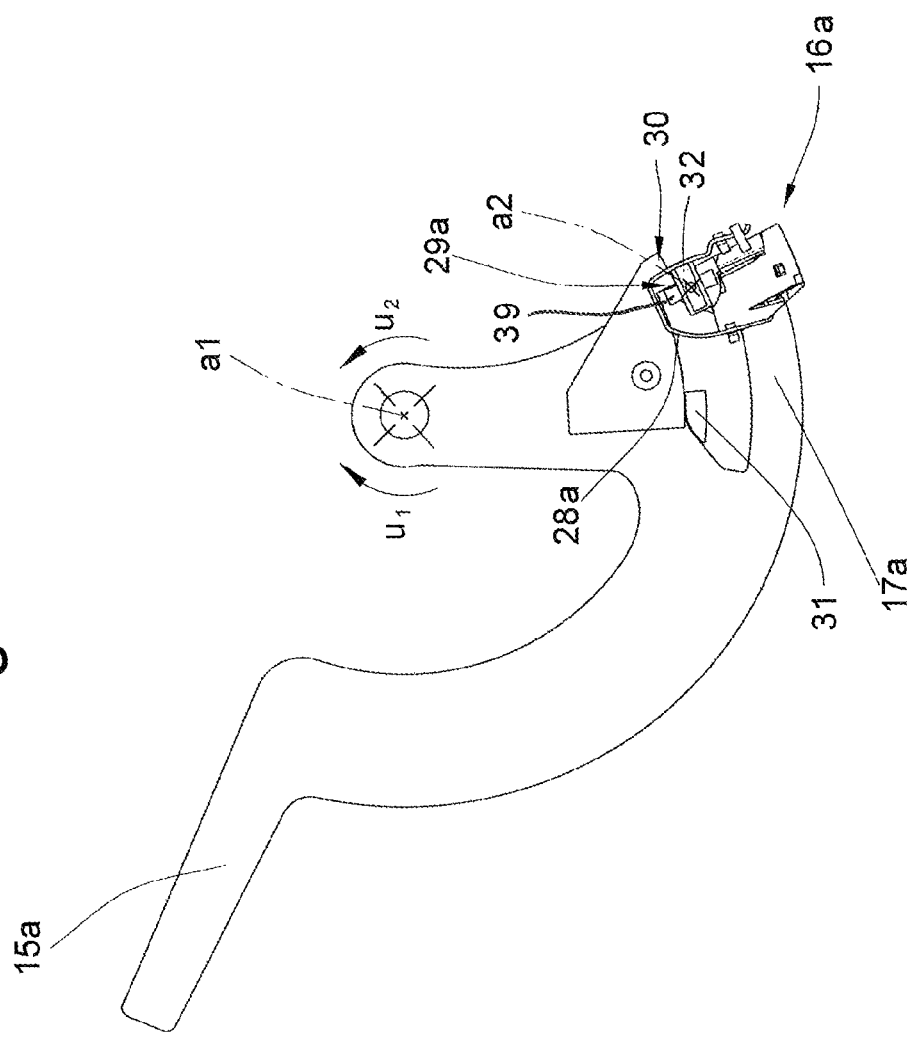

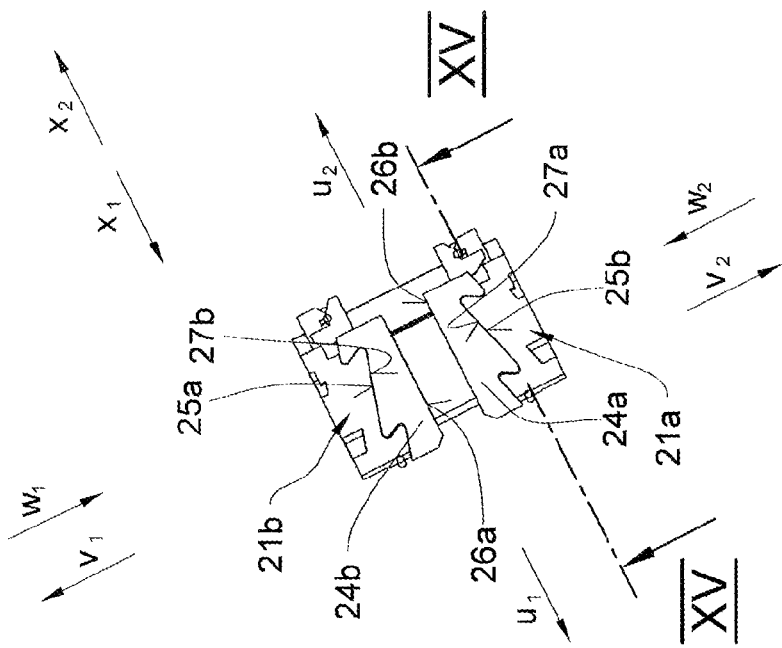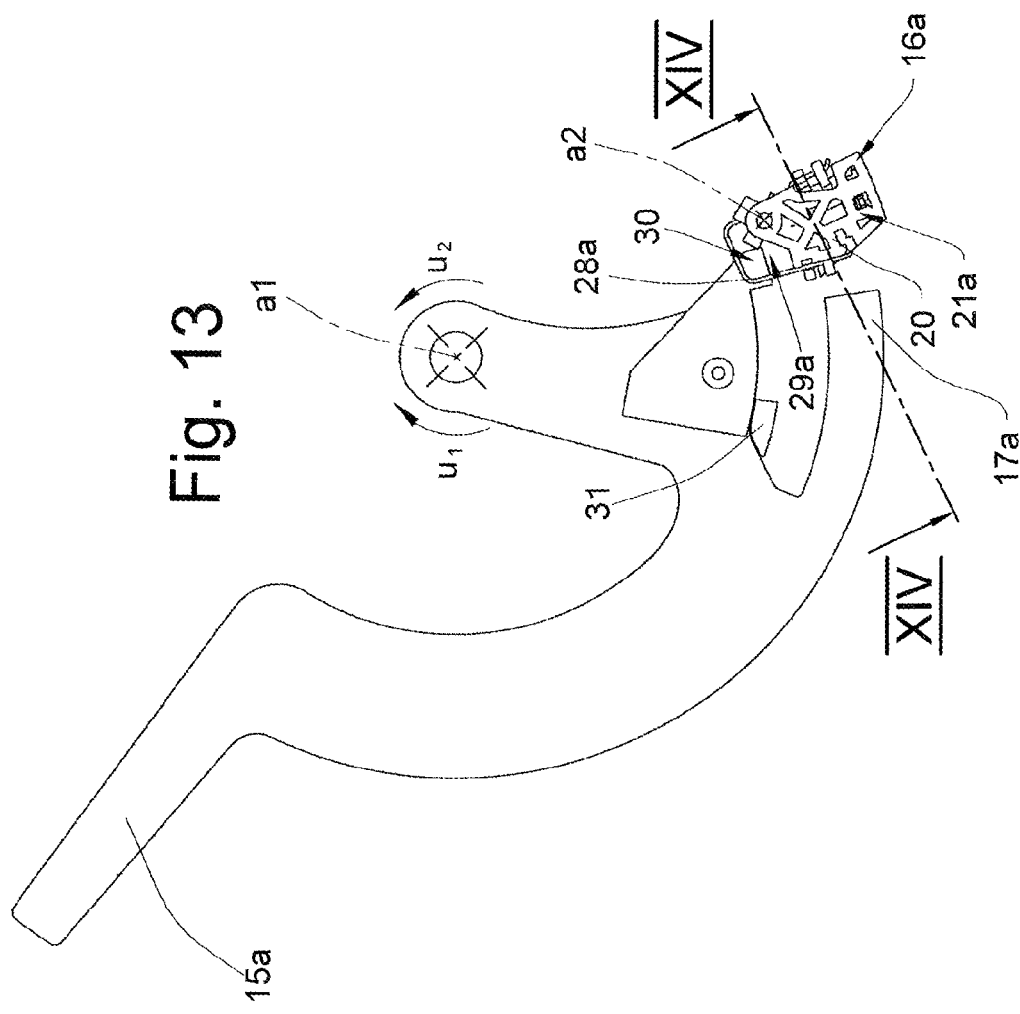

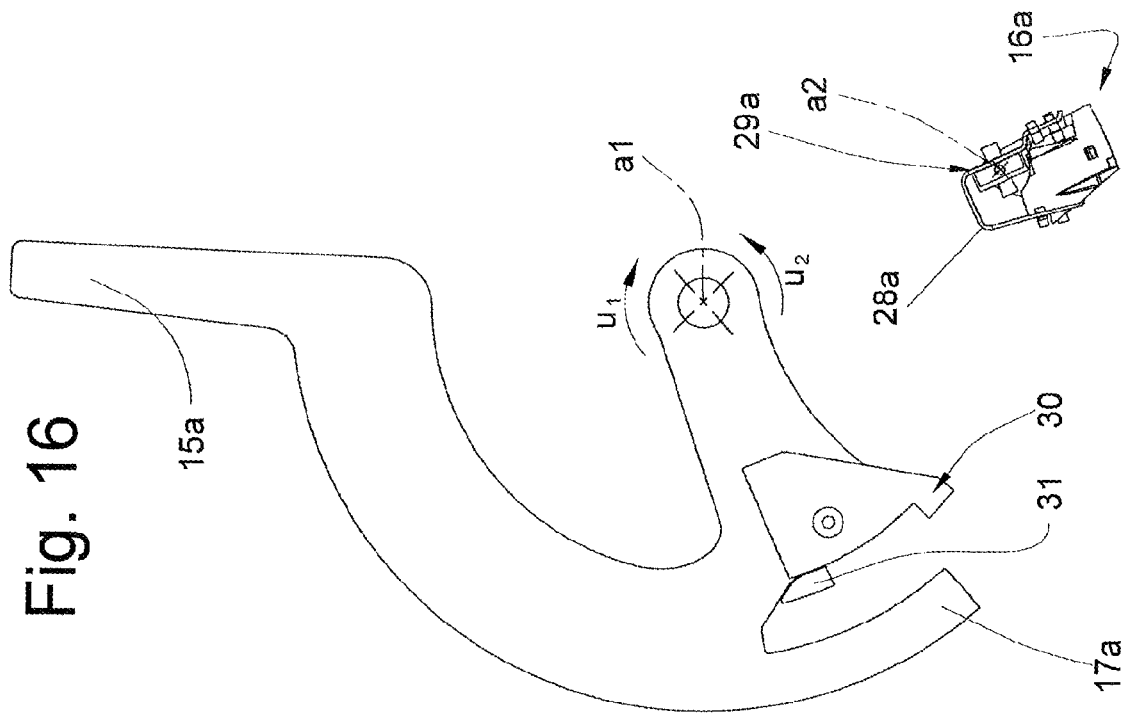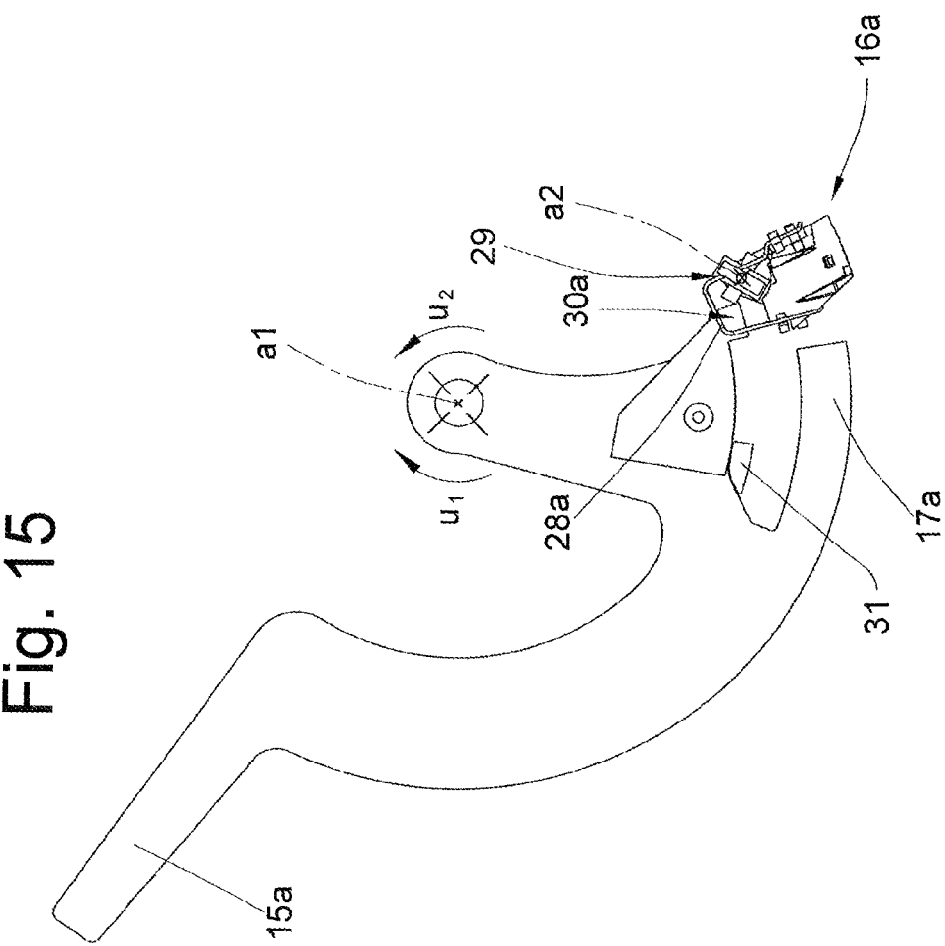

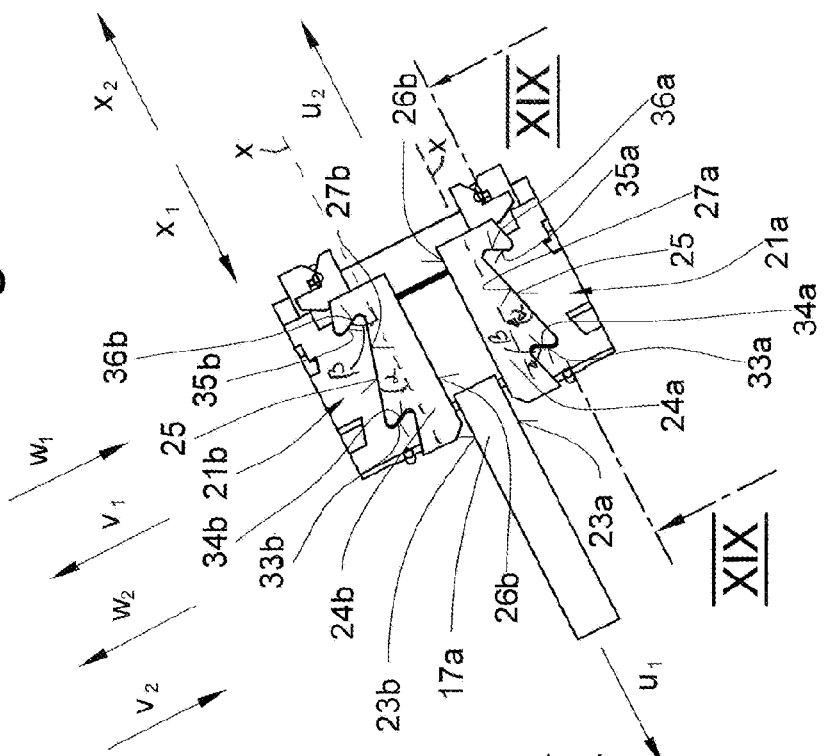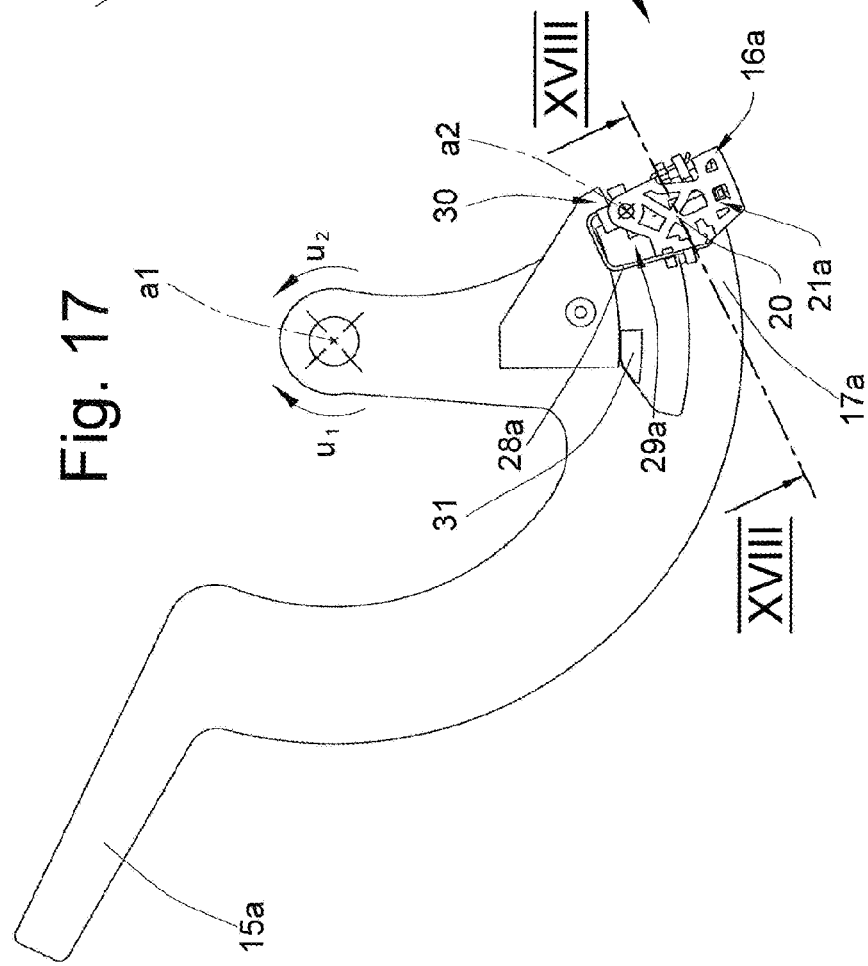

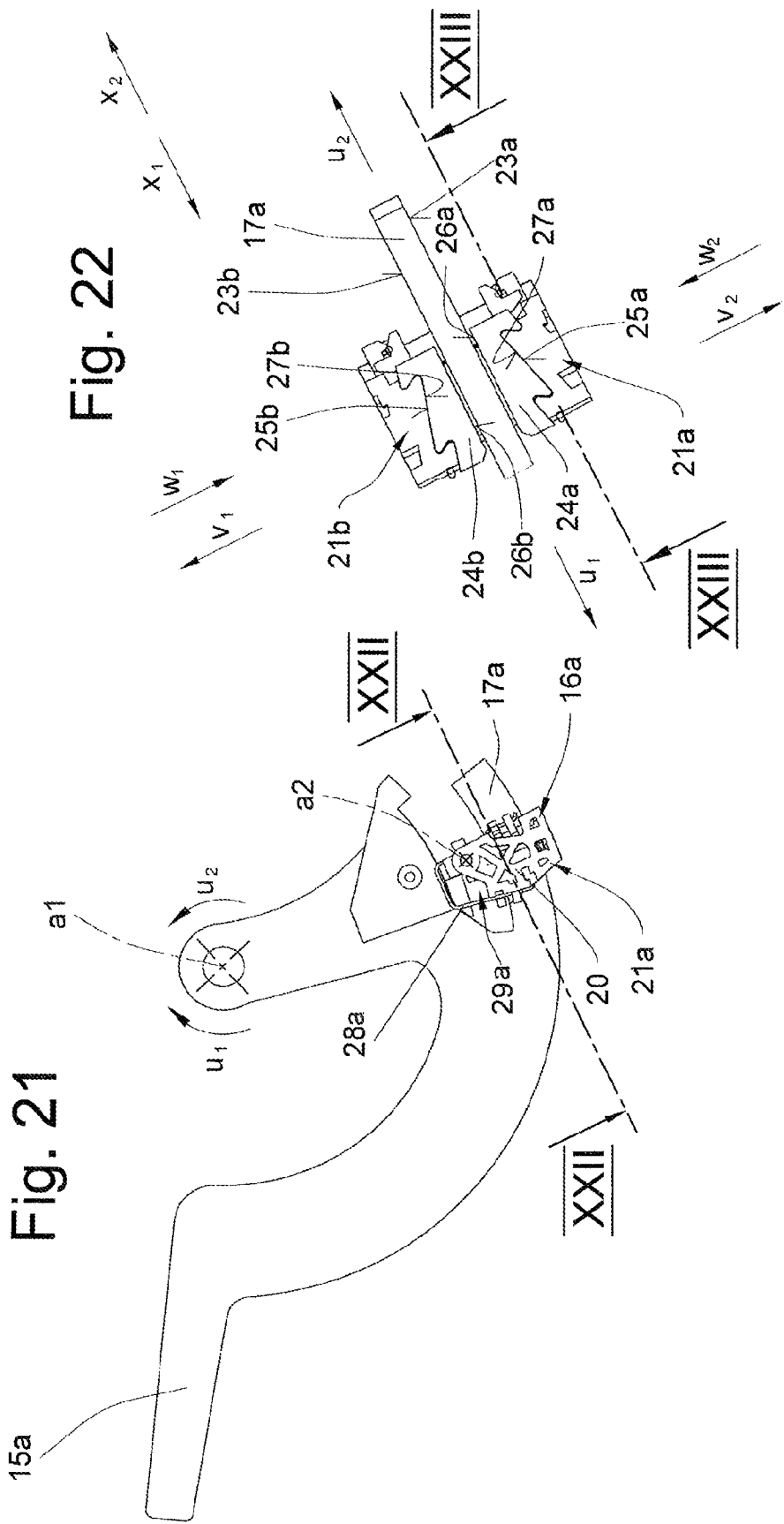

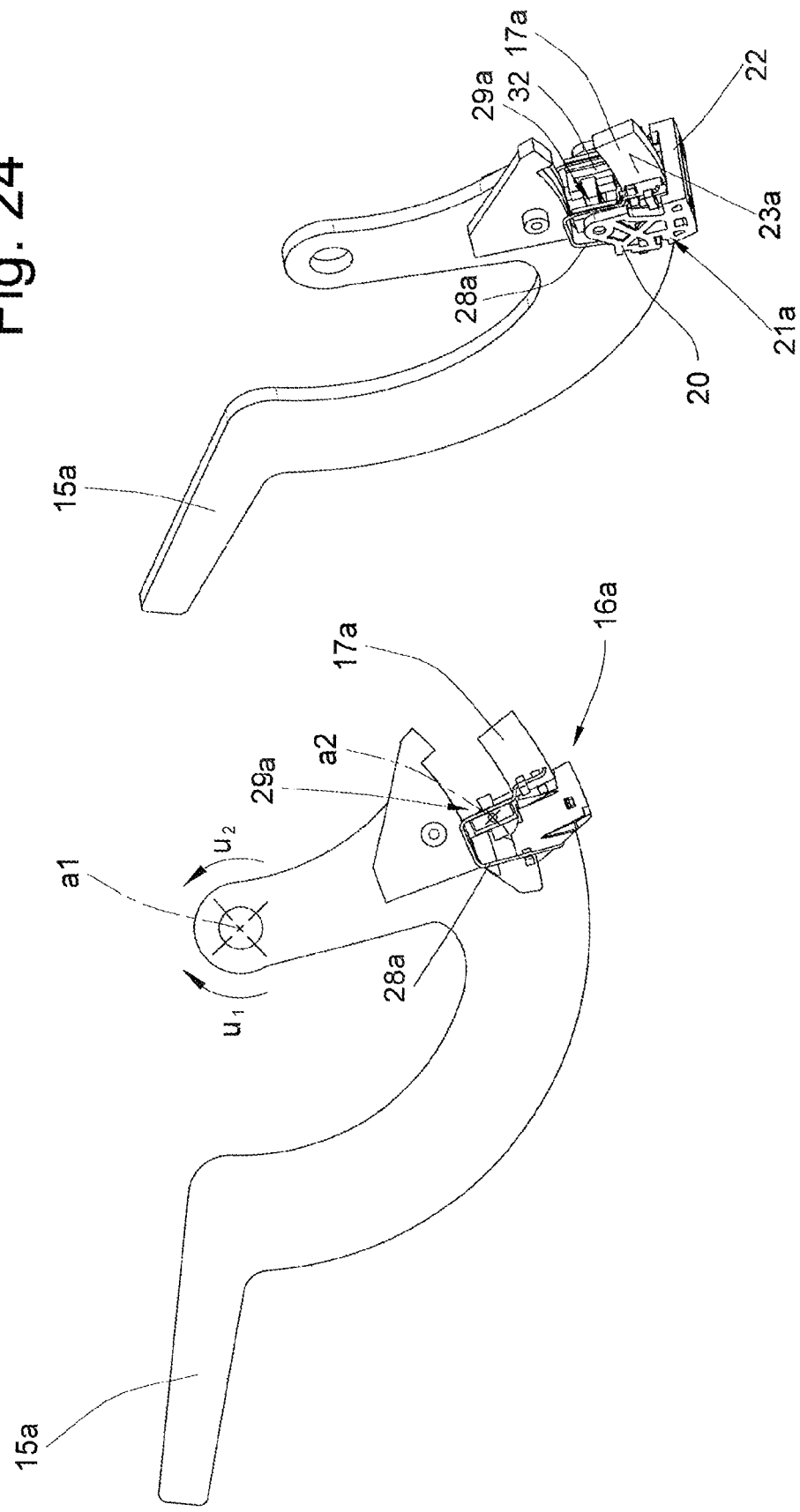

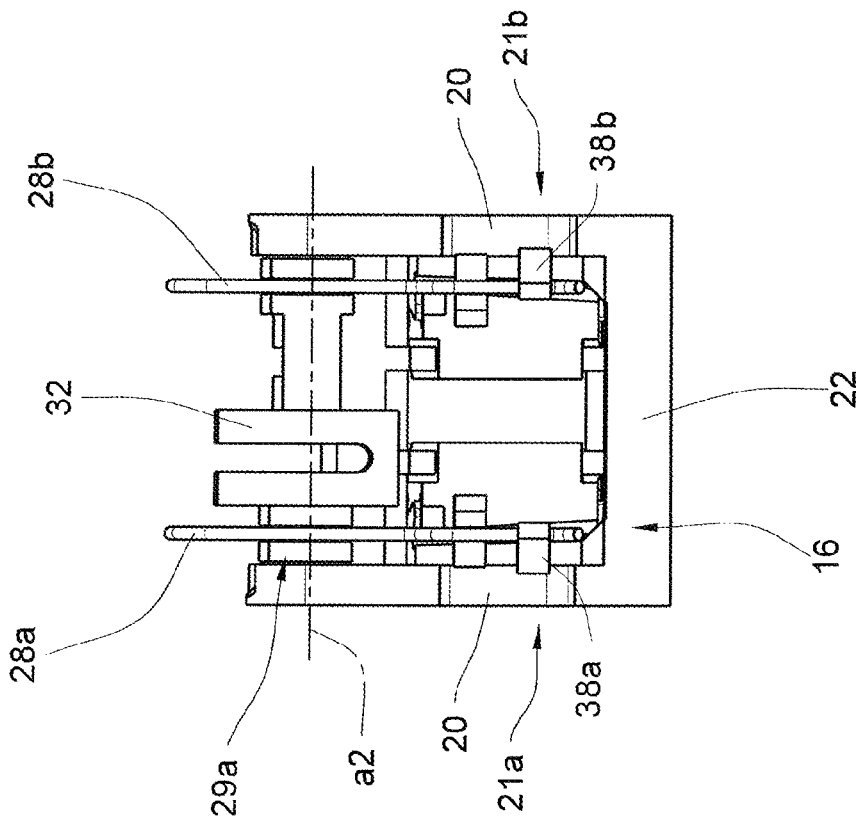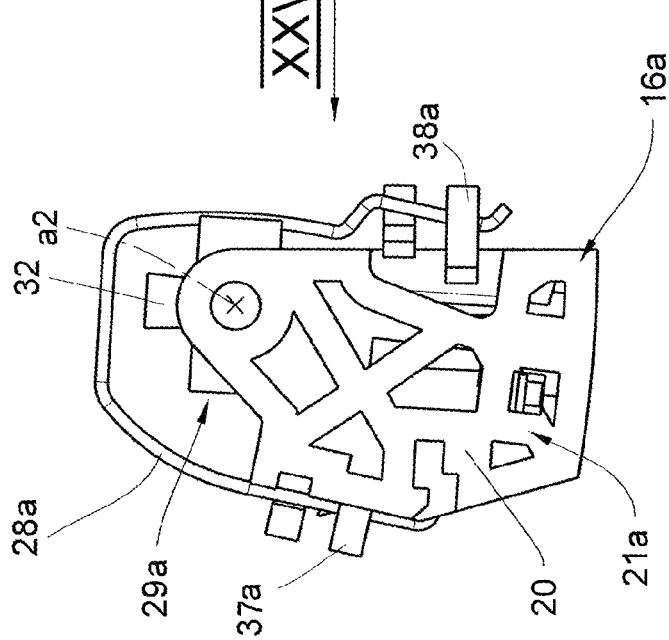

MOTOR VEHICLE FOLD-DOWN ARMREST

FIELD OF THE INVENTION

The present invention relates to a pivotal motor-vehicle accessory. More particularly this invention concerns a fold-down armrest for a motor-vehicle seat.

BACKGROUND OF THE INVENTION

Pivotal accessories are employed, for example for armrests in vehicle interiors or for covers of stowage compartments, for example in center consoles.

Such armrests are known in the art in which the arm supports of the armrests can be pivoted between an essentially horizontal starting position and an approximately vertical raised position, the arm support being lockable in intermediate positions. The armrest can for example have a control device that pivoting between the starting position and the raised end position allows the arm support to be pivoted to a first pivot position, yet prevents any pivot movement in the opposite pivot direction. Once the upper position has been reached, the latch is operated by the control device so as to enable the arm support to be pivoted freely in both directions until the starting position has been reached. Once the starting position has been reached, the latch is once again operated so as to allow the arm support to pivot only in one pivot direction.

OBJECTS OF THE INVENTION

It is therefore an object of the present invention to provide an improved pivotal motor-vehicle accessory.

Another object is the provision of such an improved pivotal motor-vehicle accessory that overcomes the above-given disadvantages, in particular that is provided with a latch which is simple to produce but nevertheless ensures a high degree of functional reliability.

SUMMARY OF THE INVENTION

In combination with a motor-vehicle accessory having a pivotal element that can pivot about an axis on a generally fixed is support element, a mechanism has according to the invention an extension on one of the elements offset from the axis and projecting angularly of the axis, and a brake on the other of the elements having a pair of brake shoes flanking the extension and shiftable between a clamping position gripping the element and preventing movement of the element relative to the brake in at least one angular direction and a release position permitting movement of the element relative to the brake both in and against the one direction.

In other words, with the device according to the invention, a pivotal element is pivotally attached to a vehicle-fixed bracket. A latch allows pivoting of the pivotal element between a starting position and a raised end position, and can be locked at different positions. The latch has a locking means including at least one locking extension and a second locking means including at least one brake shoe. The brake shoes are able to move between a clamping position and a release position. The locking extension is, for example associated with the pivotal element, while the brake shoes are associated with the bracket or support element. The locking extension can be clamped in place in the clamping position by the brake shoes so as to prevent any movement by the pivotal element. The pivotal element is able to move when the brake shoe is in the release position. Friction can be applied by the brake shoes to faces of the locking extension, which frictional force acts a right angle to the direction of motion of the locking extension.

In a first embodiment, the latch has a control device by which the brake shoe can be moved indirectly or directly to the release position and/or to the clamping position. Control can be effected, for example as a function of the position of the pivotal element. Alternatively, control can be effected by a switch that can be actuated manually.

In another embodiment, the control device has first control means that are associated with the first locking means, and second control means are associated with the second locking means. At specific positions of the pivotal element, for example in the starting position and/or the raised end position, the first control means can for example interact with the second control means and effect an adjustment of the latch.

In another embodiment, the first control means comprise at least one control cam by which the brake shoe is able to move to the clamping position and/or to the release position. The control cam is attached to the pivotal element, for example in such a way that an adjustment of the latch is initiated in certain positions of the pivotal element, such as for example in the starting position and/or the raised end position.

In another embodiment of the invention, the brake shoe is biased by a spring into the clamping position and/or into the release position. The spring device is, for example able to move between a first position and a second position. In the second position, the spring forces the brake shoe into the clamping position. In the first position, the brake shoe is held in the release position.

In another embodiment, the spring device can be moved by an adjustment device to the first position and/or the second position, and can be held in the first position or the second position. The adjustment device can, for example be actuated by the first control means, for example, by at least one cam. The cam is, for example permanently attached to the pivotal element. The adjustment device is composed, for example of an adjustment lever. The adjustment lever is provided, for example, in the form of a multi-arm lever. One lever arm interacts, for example with the cam, while a second lever arm functions to operate the spring device.

In another embodiment, the brake shoe includes a friction face that interacts with the braking face of the locking extension, and a control face that interacts with the face of a support element. This embodiment enables the brake shoe, first of all, to be provided with the optimal frictional properties for interacting with the locking extension, and, second, to be provided with a specific motion characteristics.

In another embodiment of the invention, a coefficient of friction is provided between the friction face and the braking face that is greater than that between the control face and the braking face of the support element. This embodiment ensures that the brake shoe can move easily between the clamping position and the release position, and that the locking extension is locked by the force of friction in the clamping position.

In another embodiment, the control face and the face of the support element create at least one first pair of oblique faces that initiates a movement of the brake shoe in the clamping direction in response to a movement by the brake shoe relative to the face of the support housing in a first direction. The oblique faces can be provided, for example at a 45° angle relative to the first direction, with the result that the movement of the brake shoe in the first direction causes a simultaneous movement perpendicular to the first direction.

In another embodiment, the control face and the face of the support element create at least one second pair of oblique faces that causes a movement of the brake shoe opposite to the clamping direction in response to a movement of the brake shoe relative to the face of the support element in a second direction.

BRIEF DESCRIPTION OF THE DRAWING

The above and other objects, features, and advantages will become more readily apparent from the following description, reference being made to the accompanying drawing in which:

FIG. 2 is a rear view of the console, taken in the direction of arrow II of FIG. 3;

FIG. 3 is a side view of the console, with the mounting arm and latch shown in faint linework;

FIG. 4 is a top view of the console, taken in the direction of arrow IV of FIG. 3;

FIG. 5 is a side view of one of the mounting arms a lower starting end position relative to the respective fixed brake;

FIG. 5a is a top view taken in the direction of arrow Va of FIG. 5;

FIG. 6 is a section taken along line VI-VI of FIG. 5;

FIG. 7 is a section taken along line VII-VII of FIG. 5a;

FIG. 8 is a perspective view of the mounting arm and brake as in FIG. 5;

FIG. 9 is a view like FIG. 5, but in a first raised position of the arm relative to the brake;

FIG. 10 is a section taken along line X-X of FIG. 9;

FIG. 11 is a section taken along line XI-XI of FIG. 9;

FIG. 12 is a perspective view of the mounting arm and brake in the first raised position;

FIG. 13 is a side view of the mounting arm in a second raised position relative to the brake;

FIG. 14 is a section taken along line XIV-XIV of FIG. 13;

FIG. 15 is a section taken along line XV-XV of FIG. 14;

FIG. 16 is a side view of the mounting arm in an uppermost raised end position disengaged from the respective brake;

FIG. 17 is a side view of the mounting arm returned to a position close to the second raised end position;

FIG. 18 is a section taken view along the line XVIII-XVIII of FIG. 17;

FIG. 21 is a side view of the position after that of FIG. 17, with the arm in a position just before reassuming the starting position;

FIG. 22 is a section taken along the line XXII-XXII of FIG. 21;

FIG. 23 is a section taken along the line XXIII-XXIII of FIG. 22;

FIG. 24 a perspective view of the structure as in FIG. 21;

FIG. 25 is a side view of the mounting arm and brake as in FIG. 23;

FIG. 26 is an side view of a brake of the latch taken in the direction of arrow XXVI-XXVI of FIG. 25;

DETAILED DESCRIPTION

Figure 1:
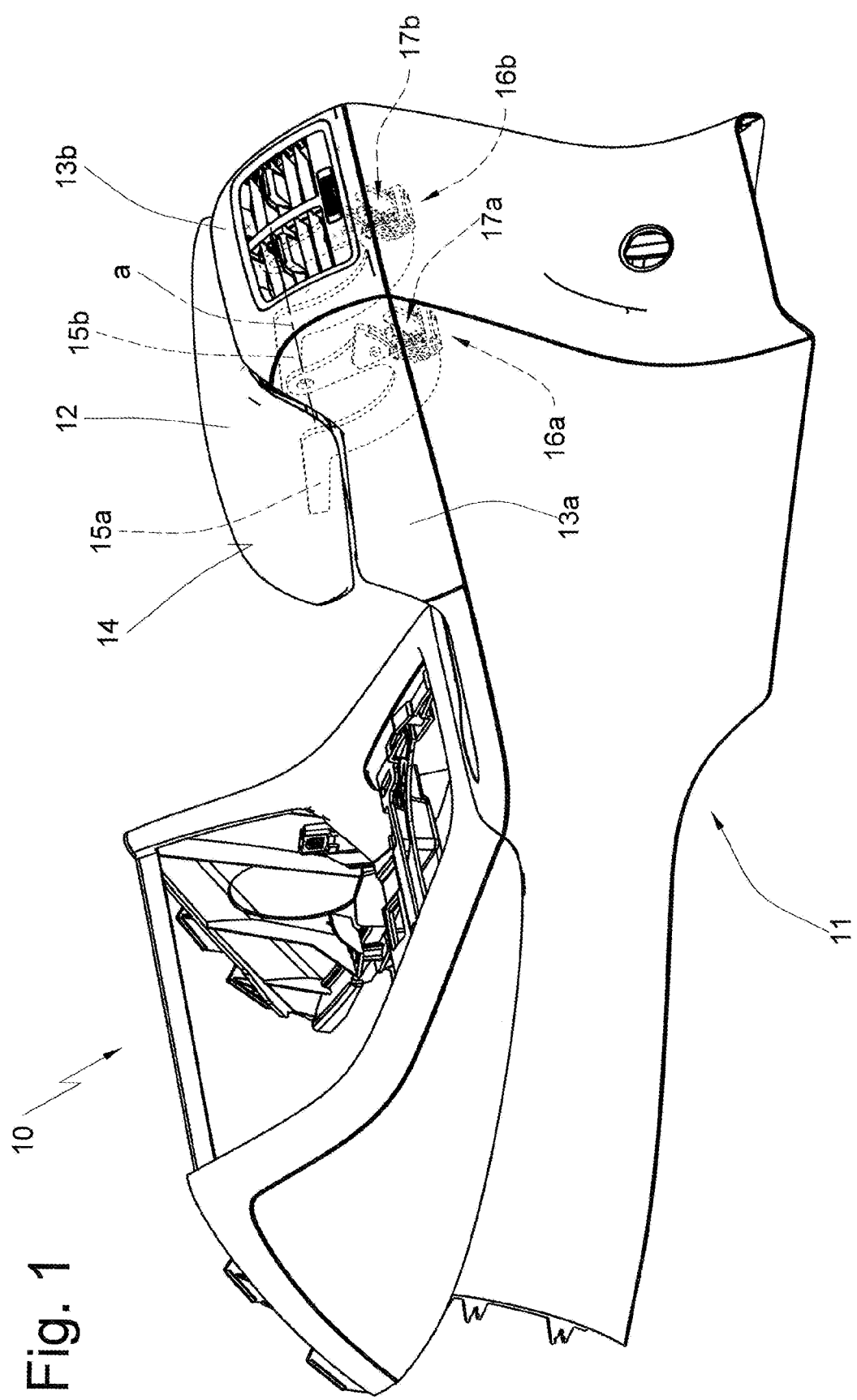
FIG. 1 is a perspective view of a motor-vehicle center console according to the invention.
Figure 20:
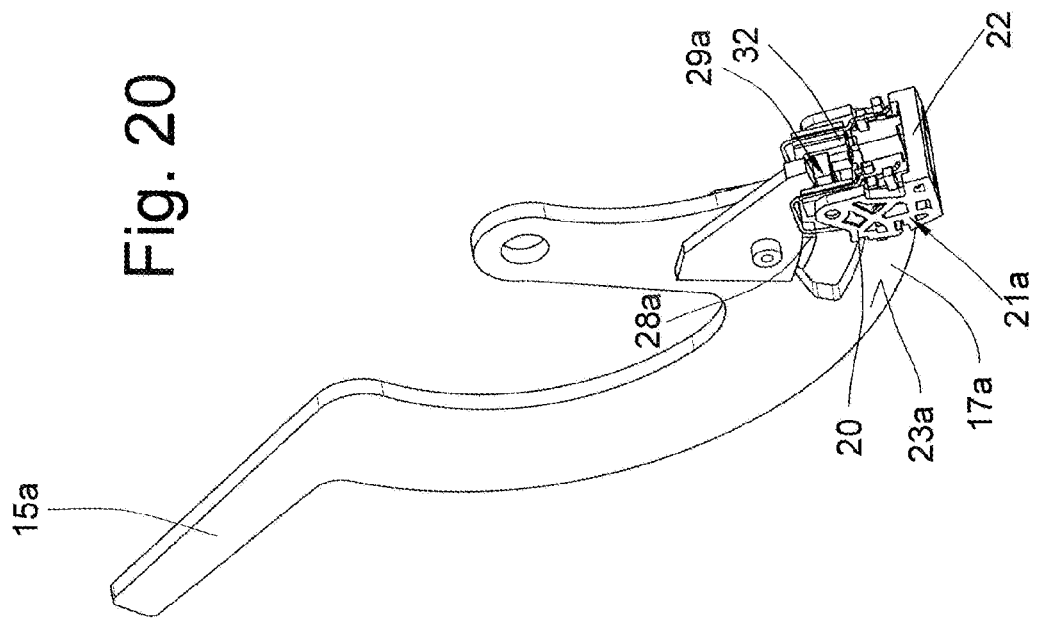
FIG. 20 is a perspective view of the mounting arm and the brake as in FIG. 17.
Figure 19:
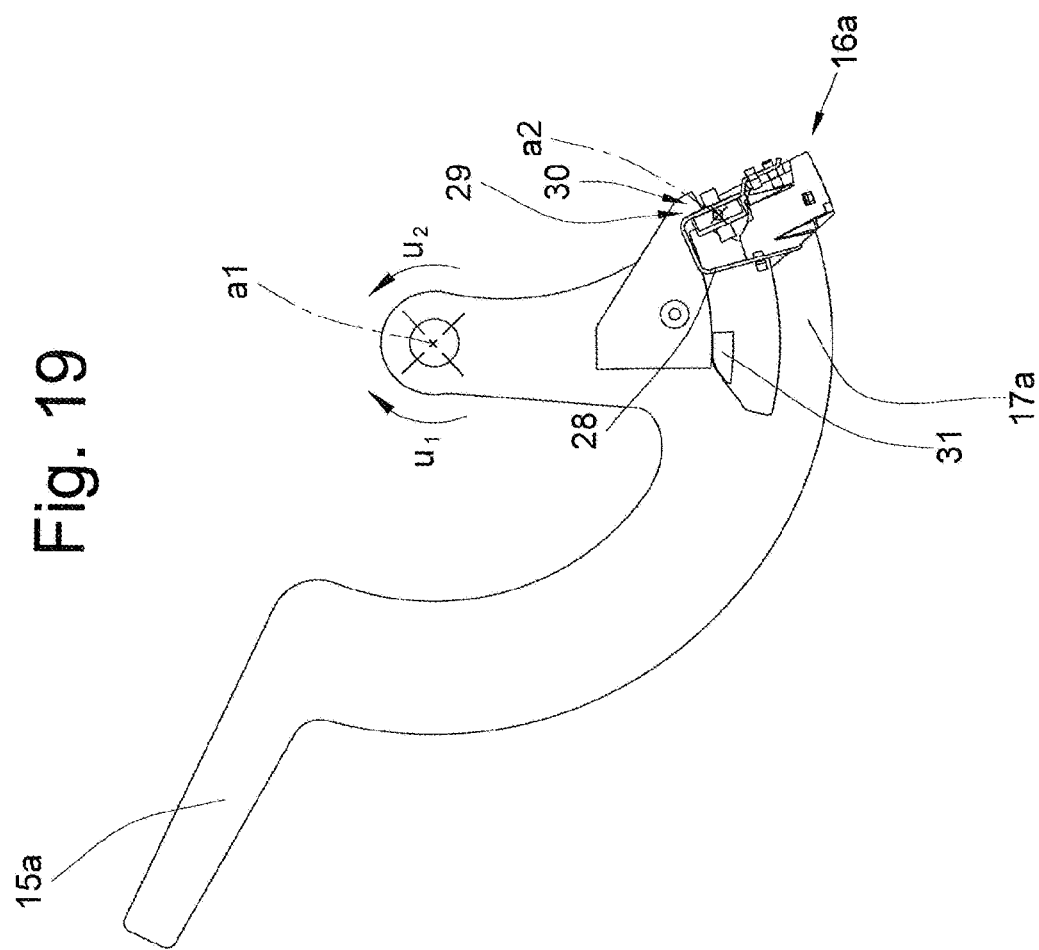
FIG. 19 is a section taken along the line XIX-XIX of FIG. 18.
Figure 28:
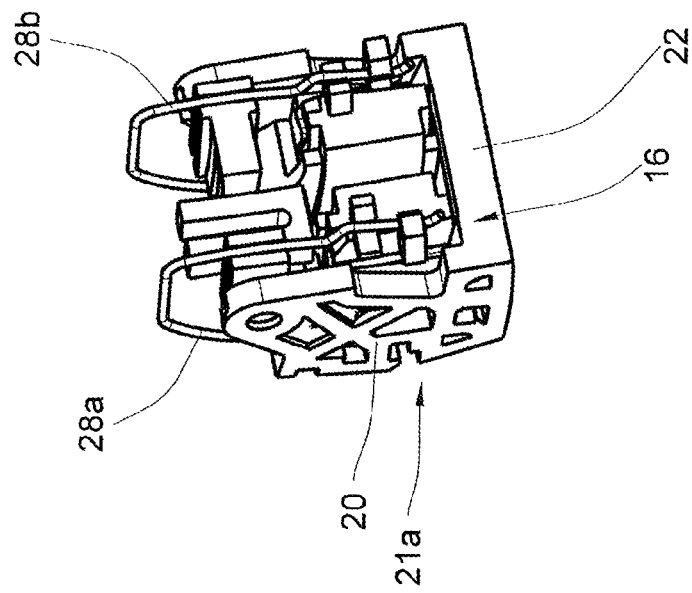
FIG. 28 is a perspective view of the brake.
Figure 27:
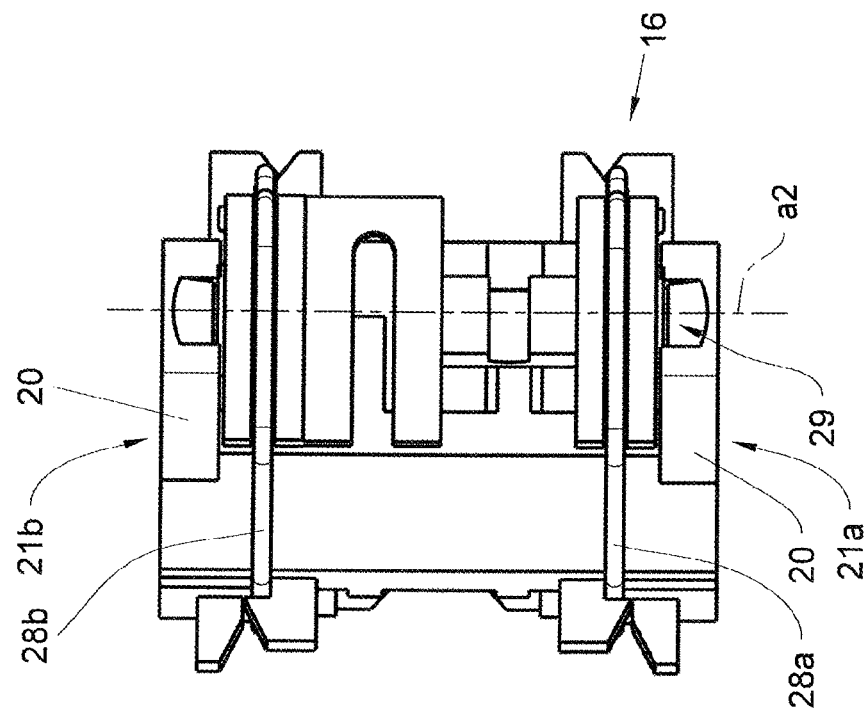
FIG. 27 is a view taken in the direction of arrow XXVII of FIG. 25.

As seen in FIG. 1 an armrest 10 according to the invention is part of a motor-vehicle center console 11. This armrest 10 has an arm support or cushion 12, and parts 13a and 13b form a housing of the center console 11. The arm support 12 in FIG. 1 is a lower starting end position that enables the arm of a passenger of the vehicle to be supported on its upper surface 14. The arm support 12 is permanently attached to two identical mounting arms 15a and 15b that are pivoted at their rear ends at a common axis a on the housing 13a, 13b. The arms 15a and 15b coact respective brakes 16a and 16b fixed on the housing 13a, 13b. A latch of the armrest 10 is formed by locking extension 17a and 17b of the mounting arms 15a and 15b and by the respective brakes 16a and 16b.

In FIGS. 2 through 4, each mounting arm 15a and 15b is mounted on a respective support 18a and 18b of the housing 13a, 13b via a pivot joint G and is thereby pivotal about a horizontal pivot axis a normally extending perpendicular to the normal vehicle travel direction. Only the support 18a is shown in FIG. 3. Extensions 19a and 19b attached to the supports 18a and 18b carry the respective brakes 16a and 16b as also shown in FIG. 4.

Movement of the arm support 12 from the starting position to various raised pivot positions is controlled by the latch so that the arm support 12 can be locked in any of these pivot positions. The mounting arms 15a and 15b and the cushion 12 can thus be pivoted from the starting position of FIGS. 5 through 8 in a direction $u_1$ until reaching a raised end position (see FIG. 16). Although movement in the direction $u_1$ is possible, movement in the opposite angular direction $u_2$ is prevented by the latch in every intermediate position between the starting position and the uppermost raised end position. Only after reaching the uppermost raised end position can the arm support 12 be pivoted back in the return direction $u_2$. Thus as the cushion or support 12 is raised, it can only pivot upward until it reaches the upper end position, whereupon it can be pivoted down again, but if released in any intermediate position, it will hold and cannot be pushed back down.

FIGS. 5-8 and 25-28 show the brake 16a, which is identical to the brake 16b. It has a U-shaped caliper 20 formed by side members 21a and 21b unitarily connected by a bight member 22. The side members 21a and 21b extend approximately parallel to respective braking faces 23a and 23b of the respective locking extension 17a. In addition, brake shoes 24a and 24b are provided that have respective back control faces 25a and 25b as well as front friction faces 26a and 26b. The control faces 25a and 25b of the brake shoes 24a and 24b are of sawtooth shape with steep and shallow flanks and are complementary to respective faces 27a and 27b of the side members 21a and 21b. The steep and shallow flanks of the sawteeth of the faces 25a and 25b are oriented relative to the directions $u_1$ and $u_2$ such that movement of the shoes 24a and 24b in the direction $u_2$ relative to the extension 17a cams the shoes 24a and 24b toward each other and into tighter engagement with the extension 17a, while opposite movement in direction $u_1$ moves them apart and releases the extension 17a.

More particularly as shown in FIG. 18, the brake shoe 24a has oblique faces 33a and 35a that interact with respective opposing faces 34a and 36a of the side member 21a. Analogously, the brake shoe 24b has oblique faces 33b and 35b, while side member 21b has respective opposing faces 34b and 36b that interact in the same way. The faces 33a, 34a, 35a, and 36a, as well as faces 33b, 34b, 35b, and 36b form an angle β with the x axis.

This has the effect that a force acts in a direction $v_1$ in response to a force in direction $x_1$ on the brake shoe 24a, while a force acts in a direction $w_1$ in response to a force in a direction $x_2$. Analogously, a force in the direction $x_1$ on the brake shoe 24b results in a force in a direction $v_2$, while a force in the direction $x_2$ results in a force in the direction $w_2$.

Directions $x_1$ and $x_2$ are parallel to an x axis, as well as to angular pivot directions $u_1$ and $u_2$. When displaced in direction $x_1$, the brake shoes 24a and 24b are moved outward and apart in the directions $v_1$, $v_2$, and when displaced in the direction $x_2$ the brake shoes 24a and 24b are moved inward in the directions $w_1$, $w_2$.

As shown in FIGS. 5, 25, and 26, a first end of a spring 28a is attached by a fitting 37a to the side member 21a, while a second end of the spring 28a is attached by a fitting 38a to the brake shoe 24a. Analogously, a first end of another such spring 28b is attached by another such fitting 37b to the side member 21b, while a second end of the other spring 28b is attached by another such fitting 38b to the brake shoe 24b. Each brake shoe 24a and 24b is biased by the respective spring 28a or 28b in the direction $x_2$ whenever the respective spring 28a or 28b is in a second tensioned position. When the spring 28a or 28b is in a first untensioned position, the brake shoes 24a and 24b are held by the springs 28a and 28b in the release position.

Each side member 21a and 21b supports a respective control wheel 29a or 29b for pivoting about an axis a2. Cams 30 and 31 fixed on the extension 17a can rotate the control wheels 29a and 29b between a first position and a second position offset angularly about the axis $a_2$ by about 90°. In the first position of the control wheels 29a and 29b the respective springs 28a and 28b are moved by actuating arms 32 of the control wheels 29a and 29b to the second position. In the second position of the control wheels 29a and 29b, the springs 28a and 28b can move to the first position by their own elastic restoring force.

When the arm support 12 moves from the starting position in the direction $u_1$, the mounting arms 15a and 15b and the locking extensions 17a and 17b, are also pivoted in the direction $u_1$ as indicated in FIG. 5. The springs 28 are in the second position, with the result that the brake shoes 24a and 24b are biased in the direction $x_2$. In response to biasing in the direction $x_2$, and thus the biasing toward each other of the brake shoes 24a and 24b associated therewith in the direction $w_1$ or $w_2$, the friction faces 26 come into contact with the braking faces 23a and 23b.

When the locking extension 17a, moves in the direction $u_1$, the brake shoes 24a and 24b are biased oppositely to the biasing of the springs 28 in the direction $x_1$ opposite the clamping direction $v_1$, $v_2$ due to the frictional locking between the approximately parallel friction faces 26 of the brake shoes 24a and 24b, and the braking faces 23a and 23b. There is thus no clamping of the locking extension 17a, thereby enabling the arm support 12 to pivot freely in the direction $u_1$.

Conversely, no movement in the direction $u_2$ is possible as long as the raised end position of the arm support 12 has not been reached. When the locking extensions 17a and 17b move in the direction $u_2$, the brake shoes 24a and 24b are biased in the direction $x_2$ in the clamping direction $w_1$, $w_2$ due to the frictional locking between the friction faces 26a and 26b of the brake shoes 24a and 24b, and the braking faces 23a and 23b. The locking extension 17a is clamped in place so strongly by the brake shoes 24a and 24b that no movement is possible by the arm support 12 in the direction $u_2$.

When the mounting arms 15a and 15b are pivoted in the direction $u_1$, the cam 30 comes into contact with an adjustment arm 39 of the control wheel 29 before reaching the raised end position (see FIGS. 9 through 12) and moves the control wheel 29 to the second position, with the result that the spring 28a and 28b are reset to the first position and simultaneously move brake shoes 24a and 24b in direction $x_1$, and in directions $v_1$, $v_2$, opposite the clamping direction. After reaching the raised end position, mounting arms 15a and 15b can be pivoted in the direction $u_2$, and also once again in direction $u_1$ as long as the raised end position has not been reached.

When the mounting arms 15a and 15b are moved in the direction $u_2$, the cam 31 comes into contact with the control wheel 29 just before reaching the raised end position (see FIGS. 21 through 24). In response to additional movement by the mounting arms 15a and 15b in the direction $u_2$ to the end position, the control wheel 29 is pivoted by the cam 31 to the first position such that the springs 28a and 28b are moved to the second position and is held in this position by the control wheels 29a and 29b. As a result, the directional locking mechanism is again activated, and the mounting arms 15a and 15b are able to move only in the direction $u_1$ until the raised end position has been reached.

I claim:

1. In combination with a motor-vehicle accessory having a pivotal element that can pivot between a pair of end positions about an axis on a generally fixed support element, a mechanism comprising:
    an extension on one of the elements;
    a brake on the other of the elements having a pair of brake shoes flanking the extension and shiftable between
        a clamping position gripping the extension and preventing movement of the pivotal element relative to the support element in at least one angular direction and
        a release position clear of the extension permitting movement of the pivotal element relative to the brake both in and against the one direction; and
    control means for shifting the brake shoes between the clamping and the release position on movement of the pivotal element into one of the end positions.

2. The combination defined in claim 1, wherein the control means includes spring means urging the brake shoes into one of the clamping or the release positions.

3. The combination defined in claim 2, wherein the control means includes a setting member engageable with the spring for shifting it between a tensioned position biasing the brake shoes into the one clamping or release position and an untensioned position urging the spring into the other of the clamping or release positions.

4. The combination defined in claim 3, wherein the brake has a caliper and each of the brake shoes has an at least partially oblique control face bearing on the caliper.

5. The combination defined in claim 4, wherein a coefficient of friction between the brake shoes and the extension is greater than a coefficient of friction between the brake shoes and the caliper.

6. The combination defined in claim 4, wherein the oblique faces are angled such that movement of the brake shoes parallel to the caliper opposite to the one angular direction shifts the brake shoes toward each other.

7. The combination defined in claim 4, wherein the control faces and complementary faces of caliper are of sawtooth shape.

8. In combination with a motor-vehicle accessory having a pivotal element that can pivot about an axis on a generally fixed support element, a mechanism comprising:
    an extension on one of the elements offset from the axis and projecting angularly of the axis;
    a brake caliper on the other of the elements; and
    a pair of brake shoes on the caliper flanking the extension, each having a respective oblique control face bearing on the caliper, and shiftable in a clamping direction between a release position permitting movement of the one element relative to the brake both in and against a first angular direction and a clamping position gripping the extension between the control faces and preventing movement of the one element relative to the brake in the first angular direction, the control faces of the brake shoes bearing obliquely on the caliper such that movement of the brake shoe on the caliper opposite to the clamping direction in response to a movement of the brake shoe relative to the caliper in a second angular direction opposite the first angular direction.

* * * * *